US 8,457,138 B1

(12) United States Patent
Boling

(10) Patent No.: US 8,457,138 B1
(45) Date of Patent: Jun. 4, 2013

(54) SYSTEMS AND METHODS FOR PROPAGATING FRAME RELAY CONGESTION NOTIFICATIONS THROUGH A PACKET NETWORK

(75) Inventor: Harold L. Boling, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 631 days.

(21) Appl. No.: 12/641,492

(22) Filed: Dec. 18, 2009

(51) Int. Cl.
*H04L 12/56* (2006.01)
(52) U.S. Cl.
USPC .......................... 370/401; 370/230; 370/236.2
(58) Field of Classification Search
USPC ....................................... 370/230, 236.2, 401
See application file for complete search history.

(56) References Cited

U.S. PATENT DOCUMENTS

2005/0157751 A1* 7/2005 Rabie et al. ................. 370/466
2005/0249119 A1  11/2005 Elie-Dit-Cosaque et al.
2005/0249124 A1* 11/2005 Elie-Dit-Cosaque et al. 370/242
2008/0259959 A1* 10/2008 Zhai ............................. 370/474
2011/0116363 A1* 5/2011 Elie-Dit-Cosaque et al. 370/216

OTHER PUBLICATIONS

Jones et al., U.S. Appl. No. 12/636,223, entitled, "System and Method for Propagating TDM Fault Information Through a Packet Network," filed Dec. 11, 2009.

* cited by examiner

*Primary Examiner* — Jason Mattis
(74) *Attorney, Agent, or Firm* — Maynard Cooper & Gale, P.C.; Jon E. Holland

(57) ABSTRACT

A communication system for propagating a congestion notification of a frame relay network through a packet network has a first interworking function (IWF). In addition, the system has a second IWF, the second IWF receives a first frame from a first frame relay node, the first frame having payload data and a header, the header comprising a frame relay congestion notification. The second IWF de-encapsulates the payload data from the first frame and encapsulates the payload data thereby forming a data packet compatible for transmission via the packet network. In addition, the second IWF transmits continuity check messages (CCMs) and the data packet via the packet network to the first IWF and controls at least one of the CCMs such that the frame relay congestion notification is propagated to the first IWF.

7 Claims, 5 Drawing Sheets

SYSTEMS AND METHODS FOR PROPAGATING FRAME RELAY CONGESTION NOTIFICATIONS THROUGH A PACKET NETWORK

BACKGROUND

Telecommunication service providers are rapidly turning toward Ethernet for a cheaper and more suitable means to backhaul packetized data. Indeed, it is common for an Ethernet network to be used for providing frame relay emulation. In such a system, an ingress interworking function (IWF) sometimes receives a frame of a frame relay signal, strips frame relay header information, and encapsulates the payload of the frame into an Ethernet packet for transmission over an Ethernet network. However, the header information stripped from the frame contains information necessary for recreating the frame at the egress IWF of the Ethernet network.

For example, frame relay congestion notifications, such as Forward Explicit Congestion Notification (FECN) and Backward Explicit Congestion Notification (BECN), are typically transmitted via frame relay headers. Upon receiving such a notification, a node might reduce its transmission rate in an effort to alleviate the congestion until the status of the FECN/BECN indicates that the congestion is no longer present. Unfortunately, there is no standard to communicate FECN/BECN across the interworking function at the edge of an Ethernet network. Unless techniques are developed to propagate FECN/BECN through the Ethernet network, the FECN/BECN information is lost when the ingress IWF strips away the frame relay header information.

Thus, a heretofore unaddressed need exists in the art for propagating frame relay congestion notifications, such as FECN or BECN, through a packet network without violating applicable protocols, such as Ethernet protocols.

SUMMARY

A communication system for propagating a congestion notification of a frame relay network through a packet network in accordance with an embodiment of the present disclosure has a first interworking function (IWF). In addition, the system has a second IWF, the second IWF receives a first frame from a first frame relay node, the first frame having payload data and a header, the header comprising a frame relay congestion notification. The second IWF de-encapsulates the payload data from the first frame and encapsulates the payload data thereby forming a data packet compatible for transmission via the packet network. In addition, the second IWF transmits continuity check messages (CCMs) and the data packet via the packet network to the first IWF and controls at least one of the CCMs such that the frame relay congestion notification is propagated to the first IWF.

A communication method for propagating congestion notifications of a frame relay network through a packet network in accordance with an embodiment of the present disclosure comprises receiving a first frame from a first frame relay node, the first frame having payload data and a header, the header comprising a congestion notification, de-encapsulating the first frame, thereby recovering the payload data from the first frame, and encapsulating the payload data thereby forming a data packet compatible for transmission via the packet network. The method further comprises transmitting the data packet via the packet network and transmitting a continuity check message (CCM) having data indicative of the congestion notification.

DESCRIPTION OF DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DESCRIPTION

A system in accordance with an embodiment of the present disclosure comprises a frame relay network having an embedded packet network. During operation information from a frame relay node is propagated through the packet network, e.g., an Ethernet network, having interworking functions at its edges. In this regard, an ingress IWF at an edge of the packet network receives the frames from the frame relay node and translates the frames to data packets for communication through the packet network. An egress IWF at an edge of the packet network receives the data packets and translates such data packets back to frame relay for propagation to a node of the frame relay network.

At times, there may be congestion information, such as a forward explicit congestion notification (FECN) or a backward explicit congestion notification (BECN), on the frame relay signal received by the ingress IWF. Such notifications are typically transmitted in the frame relay overhead.

Note that a FECN is a bit of the frame relay overhead that is transmitted by a source node requesting that a receiving node slow down its requests for additional frames. Such a FECN bit may indicate that the network bandwidth is not as great as what can be supported by the receiving node. Further note that a BECN is a bit of the frame relay overhead that is transmitted by a receiving node requesting that a source node send data more slowly. Such a BECN bit may indicate that the network bandwidth is not as great as can be supported by the source node.

The FECN or BECN state is detected by the ingress IWF node of a packet network, and the ingress IWF node uses a continuity check message (CCM) packet in order to propagate the congestion notification through the packet network. For example, the ingress IWF node may set a particular bit in the CCM in order to indicate the congestion information and then transmit the CCM through the packet network to the egress IWF. In response, the egress IWF transmits a frame relay signal having the corresponding congestion notification to a frame relay node.

Figure 1:
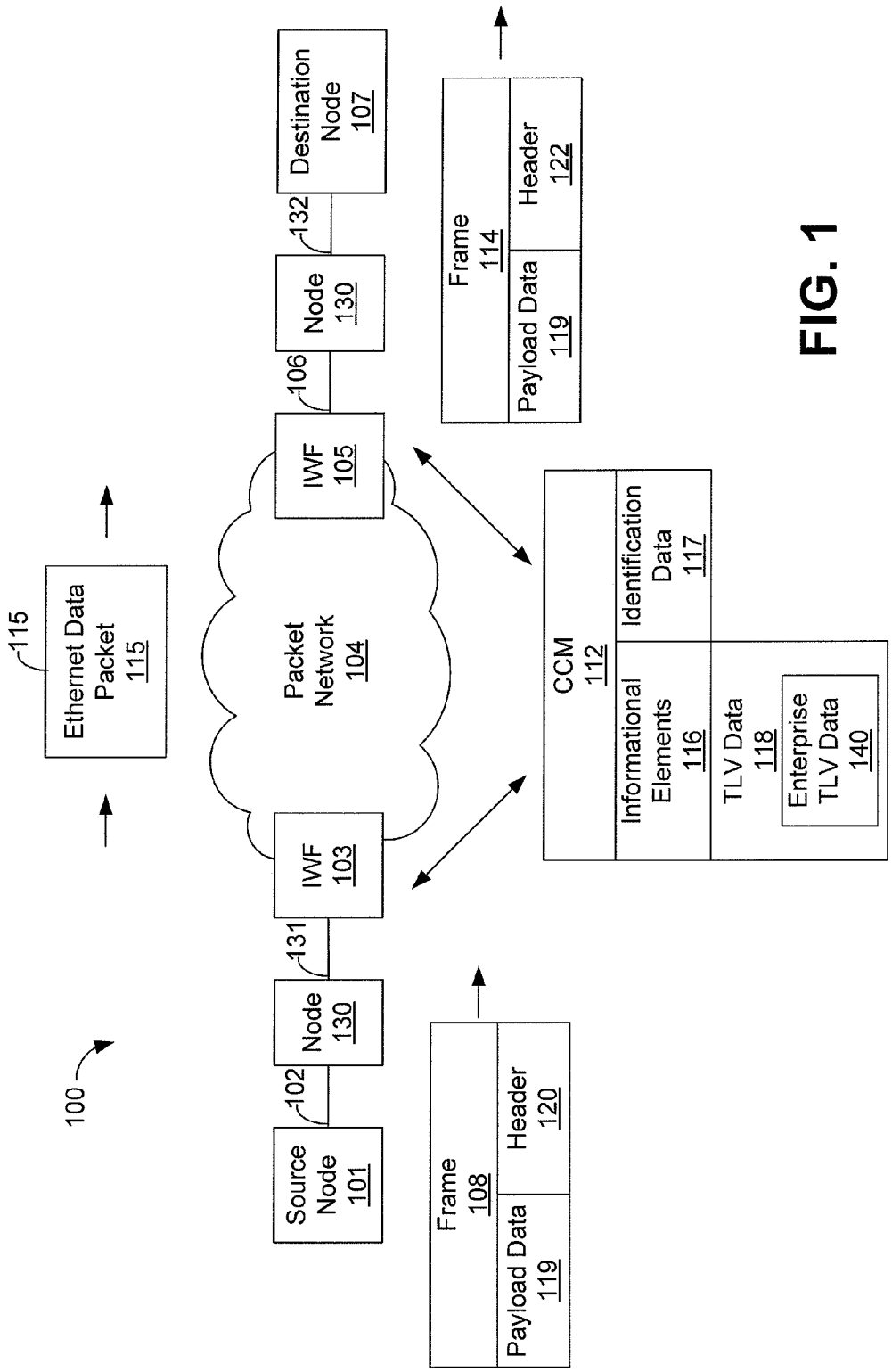
FIG. 1 is a block diagram depicting an exemplary system for propagating congestion notifications in accordance with an embodiment of the present disclosure.

FIG. 1 depicts an exemplary embodiment of a frame relay communication system 100. The system 100 has a frame relay node 101, referred to herein as the "source node," and a frame relay node 107, referred to herein as the "destination node," that communicate with one another through a packet network 104, such as an Ethernet network. Furthermore, numerous intermediate nodes 130 may exist along the frame relay segments of the system 100.

The source node 101 is coupled to an intermediate node 130 via a connection 102 and the intermediate node 130 is coupled to an interworking function (IWF) 103 of the network 104 via a connection 131. Note that the connections 102 and 131 may include, for example, one or more twisted pairs or other types of conductive media. In addition, the destination node 107 is coupled to the intermediate node 130 via a connection 132 and the intermediate node 130 is coupled to an IWF 105 via a communication connection 106. Note that such connections 106 and 132 may include, for example, one or more twisted pairs or other types of conductive media.

Data packets may be communicated by the IWFs 103, 105 through the network 104. The IWFs 103, 105 provide an interface between a frame relay network (comprising the nodes 101, 107, and 130 and connections 131 and 106) and the packet network 104, which is embedded within the frame relay network. For illustrative purposes, it will be assumed hereafter that the network 104 is an Ethernet network and that the packets communicated by the IWFs 103, 105 are in accordance with applicable Ethernet protocols, such as I.E.E.E. 802.1ag-2007, although other types of packet networks and other types of protocols are possible in other embodiments.

The IWFs 103, 105 are configured to receive frame relay signals and to translate the payload of the frame relay signals into Ethernet data packets for communication through the packet network 104. For example, assume that the source node 101 transmits a frame 108 carrying payload data 119 and a header 120 having a destination address identifying the destination node 107. The frame 108 is ultimately received by the IWF 103, which de-encapsulates the frame's payload data 119, thereby stripping the header 120 from the payload data 119, and re-encapsulates the payload data 119 into at least one Ethernet data packet 115 destined for the IWF 105. The IWF 103 transmits such Ethernet packet 115 through the packet network 104 to the IWF 105, and the IWF 105 de-encapsulates the Ethernet data packet 115 to recover the payload data 119, thereby stripping Ethernet overhead from the payload data 119, and re-encapsulates such payload data 119 into a frame 114 for transmission to the destination node 107.

Various types of protocols may be used to communicate the data that is to be received by the destination node 107. Exemplary protocols will be described in more detail below, but it should be emphasized that other protocols may be used in other embodiments. In one exemplary embodiment, a T1 signal transmitted from the source node 101 carries the frames 108, but other types of time division multiplexing (TDM) signals, such as a T3 signal, may be used. In addition, the payload data 119 encapsulated in the frame relay overhead comprises Internet Protocol (IP) packets, and such IP packets are transmitted to the IWF 105. Such IP packets include IP overhead and data. In other embodiments, the payload data 119 may be in a format other than IP, if desired.

The IWF 103 is configured to recover the payload data 119 of the frame 108 and to interwork the payload data 119 into at least one Ethernet data packet 115 for communication through the network 104. In this regard, the IWF 103 strips away the header 120 to recover the payload data 119 and then encapsulates the payload data 119 into an Ethernet data packet 115, which is transmitted through the network 104 to the IWF 105. Notably, the header 120 that is stripped away by the IWF 103 when generating the Ethernet data packet 115 may contain congestion information, as described hereinabove. For example, bits contained in the header 120 may be asserted that indicates FECN and BECN. When the header 120 is stripped away, such information is typically lost unless steps are taken to propagate the FECN and BECN through the packet network 104.

Upon receipt of the Ethernet data packet 115, the IWF 105 strips away the Ethernet header to recover the payload data 119 and then encapsulates the payload data 119 according to a frame relay protocol. Thus, the frame 114 transmitted from the IWF 105 has a frame relay header 122 in addition to the payload data 119.

In one exemplary embodiment, the IWF 105 layers the payload data 119 via the same protocols used by the source node 101. For example, if the frame 108 transmitted by the source node 101 is IP over Frame Relay over T1, then the IWF 105 may layer the payload data 119 to be received by the destination node 107 via Frame Relay and T1, as well. Thus, the destination node 107 receives data in the same format as if the packet network 104 was absent from the system 100. In such case, the presence of the network 104 is transparent to the nodes 101, 107. In other embodiments, other protocols may be used.

I.E.E.E. 802.1ag-2007 defines Ethernet Operations and Maintenance (OAM) standards that are used to convey operation and maintenance information about the network 104. Using Ethernet OAM, the IWFs 103, 105 can detect network events and issues that affect the flow of data through the packet network 104.

As an example, Ethernet OAM uses a Continuity Check Message (CCM) 112 to communicate the health of the flow between nodes (e.g., IWF 103 and the IWF 105). A CCM generally refers to a control message that is used to confirm connectivity between two nodes of a network. A CCM may include various control information about or pertaining to the message's source node. Applicable Ethernet standards define the format of a CCM in an Ethernet network, but protocols other than Ethernet may be used in various embodiments of the disclosure.

In the ordinary course, the IWF 103 and IWF 105 periodically transmit CCMs 112 to each other. If one of the IWFs 103, 105 stops receiving CCMs from the other IWF 103, 105 for at least a specified time period, then the IWF 103, 105 no longer receiving the CCMs is made aware that there is some fault in the packet network 104 preventing connectivity between the IWFs 103, 105.

In addition, the CCM 112 may have various fields indicative of the health and status of the IWF that is transmitting the CCM 112. According to Ethernet protocol, the CCM 112 comprises informational elements 116 and identification data 117. The informational elements 116 also comprise Type Length Value (TLV) data 118 among other types of data specified by Ethernet protocol.

The TLV data 118 has a number of bits that can be indicative of the state of the IWF 103, 105 that transmitted the CCM. In this regard, the TLV data 118 may have a bit (not shown) or set of bits (not shown) that when selected indicates the health of the transmitting IWF 103, 105. Such bits may be manipulated to indicate is Up, is Down, is Unknown, is Testing, is Dormant, is NotPresent, and is LowerLayerDown. Such indicators are defined by the Ethernet OAM.

In addition, and according to standard Ethernet protocol, the TLV data 118 may also contain one or more Enterprise TLV data 140. The Enterprise TLV data 140 is defined in applicable Ethernet standards. Thus, a bit or set of bits in the Enterprise TLV data 140 can be set in any manner to indicate additional characteristics of the packet network 104 or, as in the present disclosure, indicate congestion notifications of a communication network 100 without violating applicable Ethernet protocols.

Thus, if frame relay congestion notifications are transmitted by the source node 101 or the destination node 107, it is often desirable for the nodes 101, 107 to be informed of the congestion notification so that they can take actions to mitigate the effects of the congestion. For example, in the event of a FECN or BECN, it may be desirable for the nodes 101, 107 to reduce their transmission rates along a particular data path, such as a data path defined by connections 102, 106, 131, or 132 and/or to begin communication via a backup data path.

It would be beneficial if such congestion notifications indicating FECN or BECN could be transmitted through the communication system 100 end-to-end. However, the presence of the packet network 104 in the system 100 makes end-to-end propagation of FECN, BECN, or any other congestion information problematic in at least some situations.

In one exemplary embodiment, the IWFs 103, 105 are configured to use the CCMs of the Ethernet network 104 to convey frame relay congestion notifications so that such congestion notifications may propagate through the packet network 104 to any of the nodes 101, 107, or 130. In this regard, if FECN or BECN is detected in the header 120 of an incoming frame 108, such error is indicated in the Enterprise TLV data 140, for example by asserting one or more bits, hereinafter referred to as a "congestion indicator."

Note that FECN indicates congestion on the side of the communication system 100 that is sending frames, whereas BECN indicates congestion on the side of the communication system 100 that is receiving frames. Notably, in FIG. 1 and in the example provided herein, the source node 101 is transmitting a frame 108 to the IWF 103. Thus, if there were congestion on the source node side of the communication system 100, the source node 101 would include in the header 120 an asserted bit to indicate FECN. However, note that there may be congestion on the destination node side of the communication system 100. In such a scenario, the destination node 107 may send a frame (not shown) that has an asserted bit in its header (not shown) that indicates BECN to the IWF 105. In such an example, the IWF 105 would transmit a CCM 112 to the IWF 103 wherein the enterprise TLV data 140 would have an asserted congestion indicator to indicate BECN. For brevity, and simplicity, the following describes the scenario wherein the source node side of the communication system 100 is congested, and the source node 101 generates a FECN in the header 120 of the frame 108.

For example, assume that the IWF 103 receives a congestion notification, such as a FECN, due to a discovered congestion associated with the communication connection 102 or 131 or the source node 101 or the node 130. It is generally desirable for the congestion notification to propagate through the network 104 to the destination node 107. In one exemplary embodiment, to convey the congestion notification to the IWF 105, the IWF 103 is configured to transmit a CCM and to manipulate a congestion indicator in the enterprise TLV data 140 to indicate congestion in response to the FECN. Upon receiving the CCM, the IWF 105 is configured to interpret the congestion indicator in the enterprise TLV data 140 as a FECN. Thus, when the IWF 105 generates the frame 114 to be transmitted to the destination node 107, the IWF 105 controls the header 122, according to the applicable frame relay protocol, to indicate FECN. In such an example, the node 107 is informed of a FECN that occurs on an opposite side of the network 104, such as a congestion notification associated with the connection 102 and 131 or the nodes 101 or 130.

In this regard, the IWF 103 interworks a frame relay congestion notification into a CCM 112, which is transmitted to the IWF 105. The IWF 105 transmits a congestion notification to the destination node 107. Accordingly, a frame relay congestion notification is propagated from one side of the network 104 to the other in a manner that is transparent to the nodes 101, 107, or 130. In conveying the congestion notification, the packet network 104 mimics the behavior of the frame relay network.

As described above, upon interpreting a frame relay congestion notification from a CCM, the IWF 105 may be configured to transmit a congestion notification, such as a FECN, to the destination node 107 to indicate congestion. However, other techniques to indicate congestion within the frame relay network may be employed in other embodiments. For example, the IWF 105 may be configured to stop transmitting to the destination node 107 for at least a specified time period in response to a FECN indication.

Furthermore, as indicated hereinabove, the example provided is described with reference to a FECN that is transmitted by the source node 101. However, data flows both from the source node 101 to the destination node 107 and from the destination node 107 to the source node 101. In this regard, if there is congestion on the destination node side of the communication system 100, the destination node 107 may detect congestion and transmit a BECN to the IWF 105, as described hereinabove. Similar to the CCM that is generated in response to a FECN from the source node 101, the IWF 105 generates a CCM 112 wherein the enterprise TLV data 140 has a congestion indicator set to indicate congestions. Upon receipt of the CCM 112 comprising a congestion notification, the IWF 103 generates a frame (not shown) wherein the BECN bit in the header (not shown) is asserted.

Figure 2:
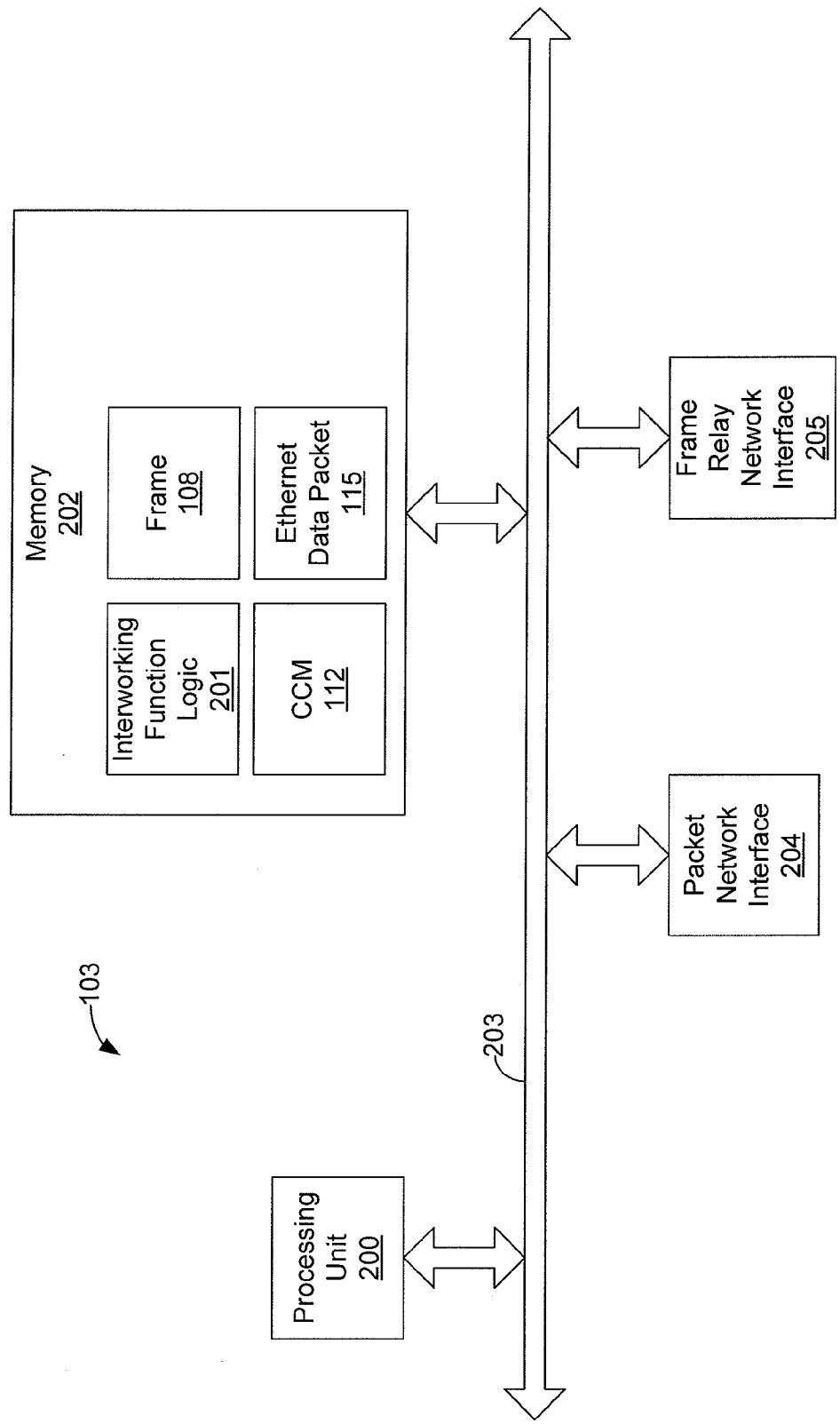
FIG. 2 is a block diagram of illustrating an exemplary embodiment of an interworking function (IWF) of the system depicted in FIG. 1.

FIG. 2 is a block diagram depicting an exemplary IWF 103 in accordance with an embodiment of the present disclosure. The IWF 103 comprises a processing unit 200, a packet network interface 204, a frame relay network interface 205, and memory 202. Each of these components communicates over a local interface 203, which can include one or more buses.

In addition, the IWF 103 comprises IWF logic 201. The IWF logic 201 can be implemented in software, hardware, firmware or any combination thereof. In the exemplary IWF 103 shown in FIG. 2, IWF logic 201 is implemented in software and stored in memory 202. Memory 202 may be of any type of memory known in the art, including, but not limited to random access memory (RAM), read-only memory (ROM), flash memory, and the like.

Processing unit 200 may be a digital processor or other type of circuitry configured to run the IWF logic 201 by processing and executing the instructions of the IWF logic 201. The processing unit 200 communicates to and drives the other elements within the IWF 103 via the local interface 203, which can include one or more buses.

In addition, the packet network interface 204 may be any type of communication device (e.g., Ethernet physical layer device (PHY)) that communicatively couples the IWF 103 with the packet network 104 (FIG. 1). The packet network interface 204 comprises hardware and may further comprise software or firmware. Further, the frame relay network interface 205 may be any type of communication device that communicatively couples the IWF 103 with connection 131 and nodes 101 or 130 of the frame relay network. The frame relay interface 205 comprises hardware and may further comprise software or firmware.

During operation, the IWF logic 201 receives, via the frame relay network interface 205, a frame 108, which the IWF logic 201 stores in memory 202. The IWF logic 201 de-encapsulates the payload data 119 (FIG. 1) from the layer 2 protocol encapsulated within the frame 108. The IWF logic 201 then encapsulates the payload data 119 within an Ethernet data packet 115, which is stored in memory 202. The IWF logic 201 then transmits the Ethernet data packet 115 to the IWF 105 (FIG. 1).

As described hereinabove, when the IWF logic 201 de-encapsulates the payload data 119 of the frame 108, header 120 (FIG. 1) is stripped away. Within the header 120 there may be a FECN or BECN indicating congestion on the connections 102, 131 or on the nodes 101 or 130. Thus, during operation, the IWF logic 201 determines, based upon the header 120, whether a FECN or BECN has been asserted in the header 120.

If a change in the FECN or BECN state is detected by the IWF logic 201, the IWF logic 201 generates a CCM 112 that comprises enterprise TLV data 140 (FIG. 1) in which a congestion indicator is controlled by the IWF logic 201 indicate congestion. The IWF logic 201 then transmits the CCM 112 to the IWF 105, which interprets the enterprise TLV data 140 and the congestion indicator as indicating a FECN or BECN condition, and in turn controls the header 122 of a frame 114 (FIG. 1) indicating FECN or BECN, as appropriate.

Note that during operation, the IWF 103 continues to send CCMs 112 from time-to-time that indicate the current congestion state until the IWF 103 receives a frame 108 that indicates that the congestion state has changed. As an example, assume that the IWF logic 201 receives a frame 108 having FECN indicated in the header 120 (FIG. 1). In response, the IWF logic 201 sends a CCM 112 having the congestion notification in the enterprise TLV data 140. Periodically, in the ordinary course, the IWF logic 201 continues to send CCMs 112. The IWF logic 201 controls the congestion indicators of such CCMs to indicate congestion until the IWF logic 201 receives a frame 108 in which the header 120 indicates that the congestion has cleared, i.e., the FECN or BECN bit in the header 120 is deasserted.

Figure 3:
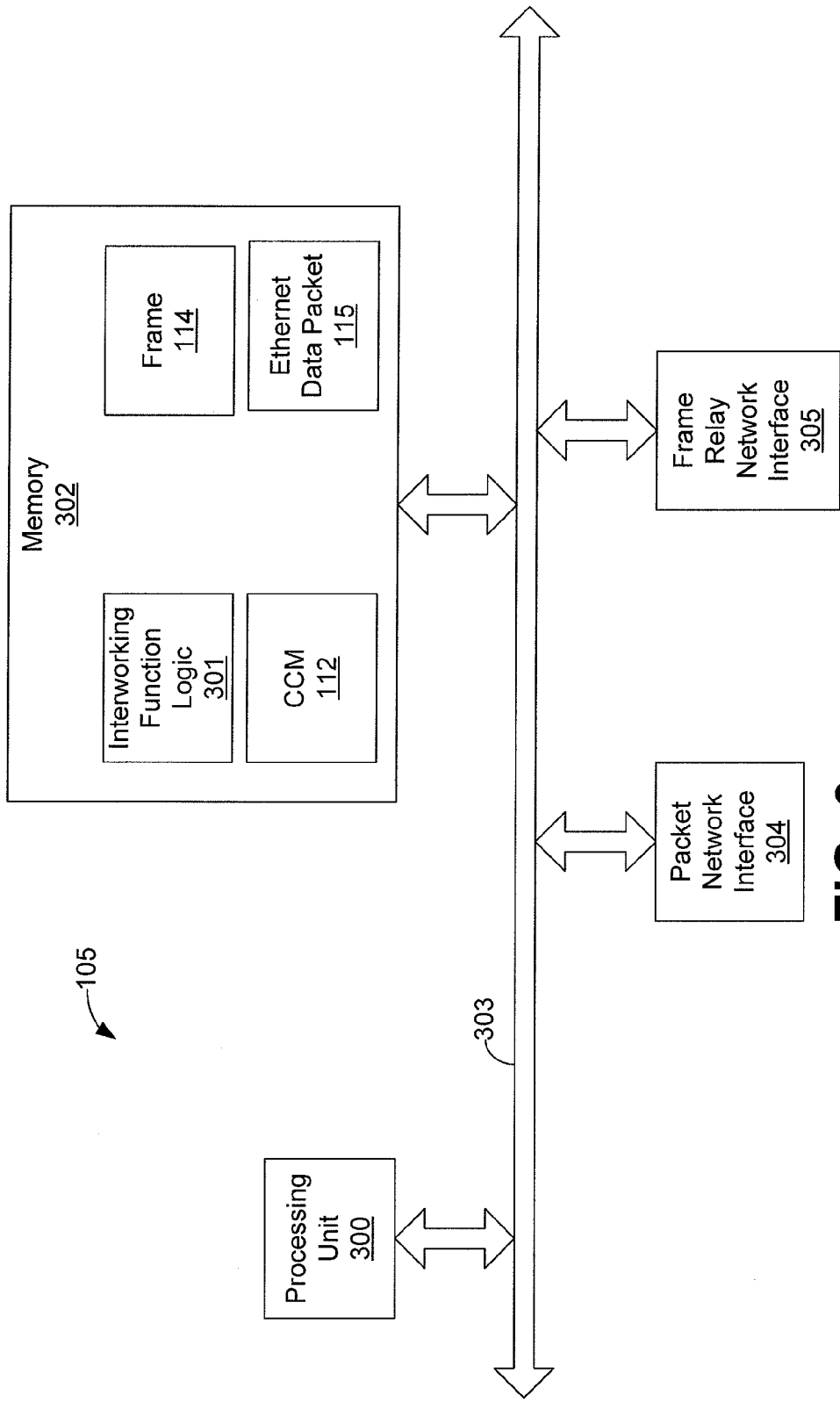
FIG. 3 is a block diagram of illustrating an exemplary embodiment of another interworking function (IWF) of the system depicted in FIG. 1.

FIG. 3 is a block diagram depicting an exemplary IWF 105 in accordance with an embodiment of the present disclosure. The IWF 105 comprises a processing unit 300, a packet network interface 304, a frame relay network interface 305, and memory 302. Each of these components communicates over a local interface 303, which can include one or more buses.

In addition, the IWF 105 comprises IWF logic 301. The IWF logic 301 can be implemented in software, hardware, firmware or any combination thereof. In the exemplary IWF 105 shown in FIG. 3, IWF logic 301 is implemented in software and stored in memory 302. Memory 302 may be of any type of memory known in the art, including, but not limited to random access memory (RAM), read-only memory (ROM), flash memory, and the like.

Processing unit 300 may be a digital processor or other type of circuitry configured to run the IWF logic 301 by processing and executing the instructions of the IWF logic 301. The processing unit 300 communicates to and drives the other elements within the IWF 103 via the local interface 303, which can include one or more buses.

In addition, the packet network interface 304 may be any type of communication device (e.g., Ethernet PHY) that communicatively couples the IWF 105 with the packet network 104 (FIG. 1). The packet network interface 304 comprises hardware and may further comprise software or firmware. In addition, the frame relay network interface 305 may be any type of communication device that communicatively couples the IWF 105 with connections 106 and 132 to the nodes 107 and 130 (FIG. 1). The frame relay interface 305 comprises hardware and may further comprise software or firmware.

During operation, the IWF logic 301 receives from the IWF 103, via the packet network interface 304, the Ethernet data packet 115, which the IWF logic 301 stores in memory 302. The IWF logic 301 de-encapsulates the payload data 119 (FIG. 1) from the Ethernet data packet 115. The IWF logic 301 then encapsulates the payload data 119 according to layer 2 protocol for frame relay. The IWF logic 301 then transmits the payload data 119 within a frame 114 to the destination node 107 (FIG. 1) through the intermediate node 130 (FIG. 1).

During operation, the IWF logic 301 may receive a CCM 112 wherein the congestion indicator may be set to indicate congestion. The IWF 105 interprets the congestion indicator as indicating congestion within the frame relay network to which the packet network 104 is embedded.

If the IWF logic 301 interprets the CCM 112 as indicating frame relay congestion, the IWF logic 301 transmits a frame 114 having a header 122 (FIG. 1) that includes FECN or BECN. The destination node 107 is then aware of congestion occurring on the opposite side of the packet network 104 (FIG. 1).

Figure 4:
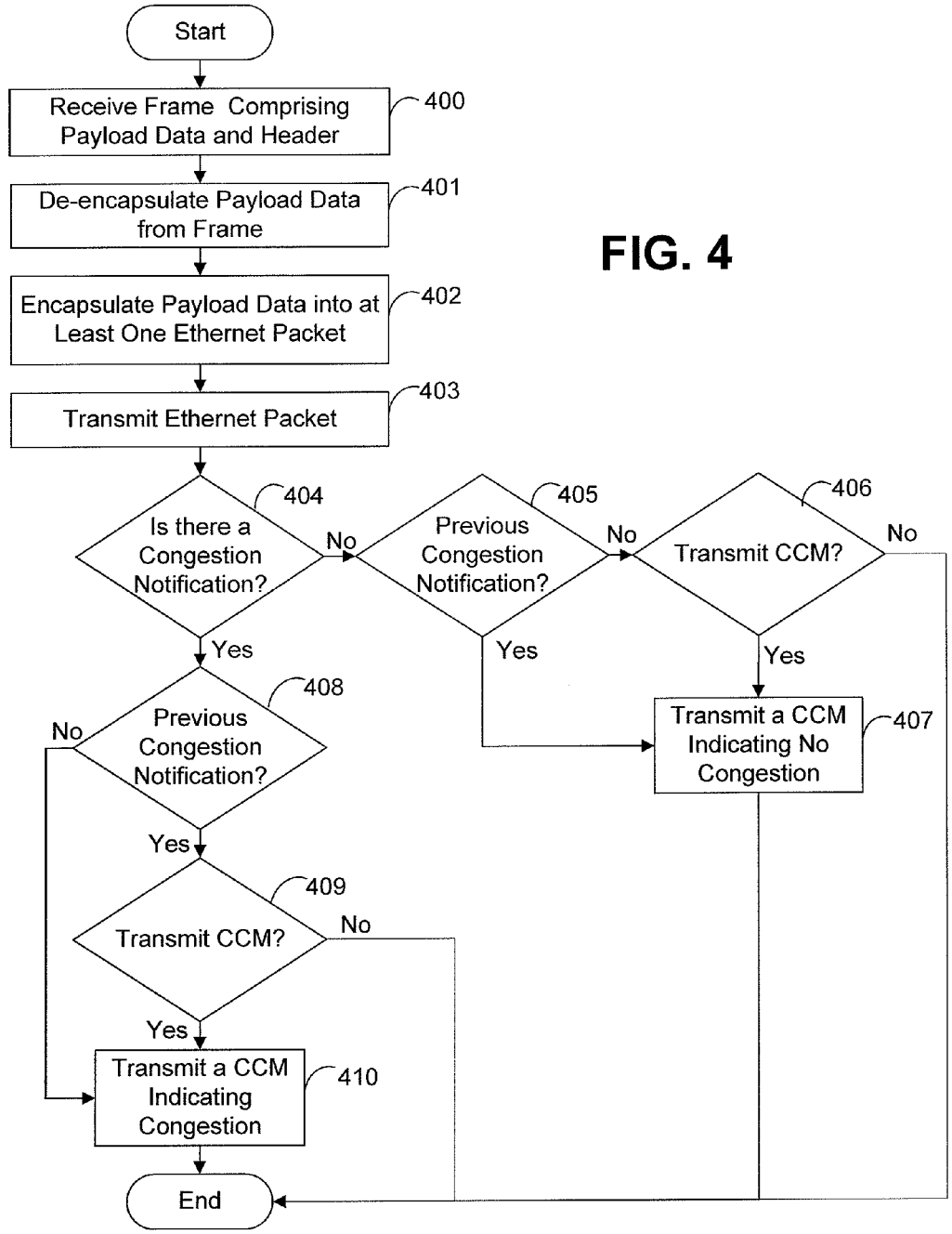
FIG. 4 is a flowchart depicting exemplary architecture and functionality of IWF logic depicted in FIG. 2.

FIG. 4 depicts exemplary architecture and functionality of the IWF logic 201. In step 400, the IWF logic 201 (FIG. 2) receives a frame 108 (FIG. 1) comprising payload data 119 (FIG. 1) and header 120 (FIG. 1). The frame 108 is received from the source node 101 (FIG. 1).

In addition, the IWF logic 201 de-encapsulates the payload data 119 (FIG. 1) from the frame 108 in step 401. As described hereinabove, the frame 108 comprises payload data 119 and header 120. In particular, in step 402, the IWF logic 201 de-encapsulates the payload data 119 by stripping away the header 120 to obtain the payload data.

The IWF logic 201 then encapsulates the payload data 119 into at least one Ethernet data packet 115 (FIG. 1), as indicated in step 402. After encapsulation into the Ethernet data packet 115, the IWF logic 201 transmits the Ethernet data packet 115 to the IWF 105 (FIG. 1), in step 403.

In addition, the IWF logic 201 determines if there is a congestion notification in the header 120 of the frame 108 in step 404. If there is a congestion notification as determined in step 404, the IWF logic 201 in step 408 determines if the same congestion notification was in the last frame received from the same signal before the current frame 108. If there was such a previous congestion notification in the penultimate frame, the IWF logic 201 determines whether it is time to transmit another CCM 112 in accordance with its periodic transmission of CCMs in step 409. If it is time to transmit another CCM 112, the IWF logic 201 transmits a CCM 112 having a congestion notification in step 410.

In one exemplary embodiment, the IWF logic 201 determines whether to transmit a CCM 112 in step 409 based on amount of time since the last transmission of a CCM 112 to the IWF 105 (FIG. 1). In this regard, if the time since the last transmission of a CCM 112 to the IWF 105 exceeds a specified threshold, the IWF logic 201 makes a "yes" determination in step 409. Otherwise, the IWF logic 201 makes a "no" determination in step 409.

If there is not a congestion notification as determined by the IWF logic 201 in step 404, the IWF logic 201 determines if there was a previous congestion notification in step 405 according to the same techniques discussed above for step 408. If there was a previous congestion notification in penultimate frame 108, the IWF logic 201 transmits a CCM 112 indicating that there is no congestion, thereby informing the IWF 105 that the previously indicated congestion no longer exists.

If there was not a previous congestion notification in the penultimate frame 108, the IWF logic 201 determines if it is time in its periodic transmission of CCMs to send a CCM in step 406. If it is time to transmit a CCM 112 in step 406, the IWF logic transmits a CCM 112 indicating that there is no congestion in step 407. Note that the same techniques described above for determining in step 409 whether to transmit a CCM 112 may be used to determine whether to transmit a CCM 112 in step 406.

Figure 5:
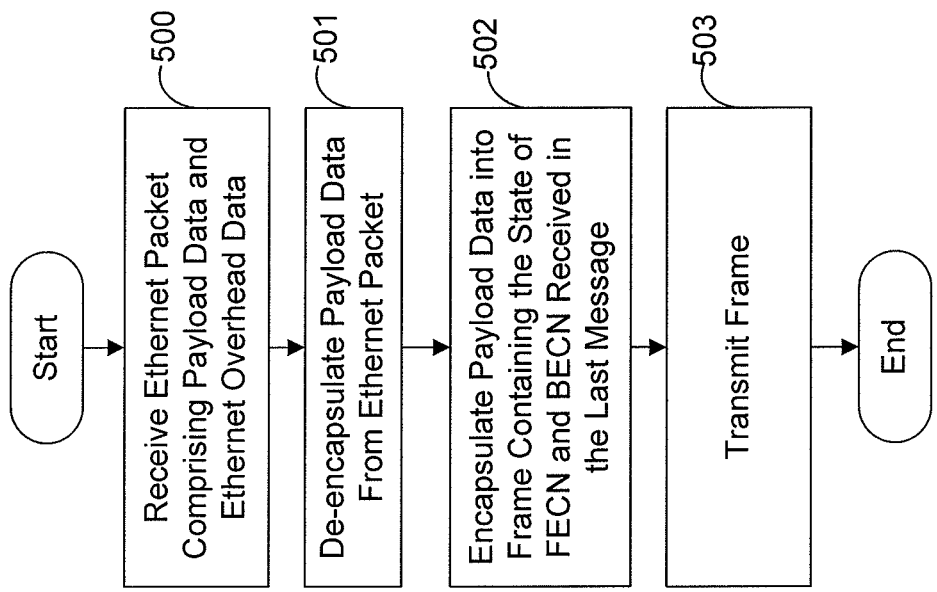
FIG. 5 is a flowchart depicting addition exemplary architecture and functionality of IWF logic depicted in FIG. 2.

FIG. 5 depicts additional exemplary architecture and functionality of the IWF logic 301 (FIG. 3). To continue with the example from FIG. 4, the IWF logic 301 receives the Ethernet data packet 115 (FIG. 1) from the IWF 103 (FIG. 1) in step 500. The Ethernet data packet 115 received comprises payload data 119 (FIG. 1) and Ethernet overhead data.

In step 501, the IWF logic 301 de-encapsulates the payload data 119 from the Ethernet data packet 115. In this regard, the IWF logic 301 strips away the Ethernet overhead data to obtain the payload data 119.

In step 502 the IWF logic 301 encapsulates the payload data 119 into the frame 114 (FIG. 1) and asserts the congestion notification bits, i.e., FECN and BECN, in the header 122 (FIG. 1) of the frame 114 in step 502. In this regard, the most recently received congestion notification bits, i.e., FECN and BECN are asserted in the frame 114.

In step 503, the IWF logic 301 transmits the generated frame 114 to the destination node 107. If the frame 114 has FECN or BECN asserted in the header 122, then the destination node 107 can respond accordingly.

The invention claimed is:

1. A communication system for propagating a congestion notification of a frame relay network through a packet network, comprising:
   a first interworking function (IWF); and
   a second IWF, the second IWF configured to receive a first frame from a first frame relay node of the frame relay network, the first frame having payload data and a header, the header comprising a frame relay congestion notification transmitted from a source node for reception by a destination node, the second IWF configured to de-encapsulate the payload data from the first frame, and to encapsulate the payload data, thereby forming a data packet compatible for transmission via the packet network, the second IWF further configured to transmit continuity check messages (CCMs) and the data packet via the packet network to the first IWF and to control at least one of the CCMs such that the frame relay congestion notification is propagated from the second IWF to the first IWF via the CCMs, wherein the frame relay congestion notification defines: (1) a Forward Explicit Congestion Notification (FECN) value indicating that the destination node is to send requests for additional frames to the source node more slowly or (2) a Backward Explicit Congestion Notification (BECN) value indicating that the destination node is to send data to the source node more slowly, wherein the data packet is not indicative of the frame relay congestion notification, wherein the second IWF is configured to de-encapsulate the data packet, thereby recovering the payload data, wherein the first IWF is configured to encapsulate the payload data from the data packet, thereby forming a second frame, and to transmit the second frame to a second frame relay node of the frame relay network, wherein the first IWF is configured to include the frame relay congestion notification in a header of the second frame based on the CCMs.

2. The system of claim 1, wherein the second IWF is configured to manipulate type length value (TLV) data of the one CCM in response to the first frame such that the TLV data is indicative of the frame relay congestion notification.

3. The system of claim 1, wherein the packet network comprises an Ethernet network, and wherein each of the CCMs is an Ethernet CCM.

4. An interworking function (IWF) on an edge of a packet network, comprising:
   an interface for coupling to a frame relay node of a frame relay network; and
   logic configured to receive a continuity check message (CCM) and a data packet transmitted through the packet network, the data packet having payload data and the CCM having a congestion notification, wherein the logic is configured to form a frame for transmission via the frame relay network and to de-encapsulate the payload data from the data packet, wherein the logic is configured to insert the payload data into the frame and to control a header of the frame to indicate a Forward Explicit Congestion Notification (FECN) value based on the congestion notification of the CCM, wherein the FECN value indicates that a destination node for the frame is to send requests for additional frames to a source node for the frame more slowly, and wherein the logic is further configured to transmit the frame to the frame relay node.

5. A communication method for propagating congestion notifications of a frame relay network through a packet network, comprising:
   receiving a first frame from a first frame relay node of the frame relay network, the first frame having payload data and a header, the header comprising a frame relay congestion notification transmitted from a source node for reception by a destination node, wherein the frame relay congestion notification defines: (1) a Forward Explicit Congestion Notification (FECN) value indicating that the destination node is to send requests for additional frames to the source node more slowly or (2) a Backward Explicit Congestion Notification (BECN) value indicating that the destination node is to send data to the source node more slowly;
   de-encapsulating the first frame, thereby recovering the payload data from the first frame;
   encapsulating the payload data thereby forming a data packet compatible for transmission via the packet network;
   transmitting the data packet via the packet network;
   transmitting via the packet network a continuity check message (CCM) having data indicative of the frame relay congestion notification;
   de-encapsulating the data packet, thereby recovering the payload data from the data packet;
   encapsulating the payload data from the data packet, thereby forming a second frame;
   transmitting the second frame to a second frame relay node of the frame relay network; and
   controlling a header of the second frame based on the CCM such that the header of the second frame indicates the frame relay congestion notification.

6. The method of claim 5, further comprising manipulating a type length value (TLV) data of the CCM in response to the first frame such that the TLV data is indicative of the frame relay congestion notification.

7. The method of claim 5, wherein the packet network comprises an Ethernet network, and wherein the CCM is an Ethernet CCM.

* * * * *